United States Patent [19]
Gurusami et al.

[11] Patent Number: 5,255,318
[45] Date of Patent: Oct. 19, 1993

[54] EXPANDABLE CABLE TELEVISION SUBSCRIBER CONTROL SYSTEM

[75] Inventors: Aravanan Gurusami, E. Syracuse; Robert Chamberlin, Manlius; Victor J. Jacek, Syracuse; Thomas P. Strong, Pompey; Jeffrey L. Cox, Camillus; Mark Chapman, Bridgeport, all of N.Y.

[73] Assignee: North American Philips Corporation, New York, N.Y.

[21] Appl. No.: 839,139

[22] Filed: Feb. 20, 1992

Related U.S. Application Data

[63] Continuation-in-part of Ser. No. 673,872, Mar. 22, 1991, Pat. No. 5,140,633.

[51] Int. Cl.5 .............................................. H04N 7/167
[52] U.S. Cl. ............................................ 380/7; 380/6; 455/26.1
[58] Field of Search ............... 380/6, 7, 8; 358/349; 455/26.1

[56] References Cited

U.S. PATENT DOCUMENTS

| | | | |
|---|---|---|---|
| 4,613,826 | 9/1986 | Masuko et al. | 380/6 X |
| 4,769,838 | 9/1988 | Hasegawa | 380/7 |
| 4,912,760 | 3/1990 | West, Jr. et al. | 380/7 |
| 4,991,206 | 2/1991 | Blais . | |
| 5,014,309 | 5/1991 | West, Jr. | 380/7 |
| 5,140,633 | 8/1992 | Gurusami et al. | 380/7 |

*Primary Examiner*—Tod R. Swann
*Attorney, Agent, or Firm*—Michael E. Marion

[57] ABSTRACT

A subscriber control system designed to be placed outside of the subscriber's home, for controlling access to cable television signals provided by a cable television headend. The system is modular in design containing a single control module and a single RF distribution module both shared by a number of jammer modules. The jammer modules contain a plurality of frequency agile oscillators, the frequencies of which can be changed in time-multiplex fashion. The outputs of the jammer modules can be shared amongst a number of subscribers using space division switching. The system features switching utilizing a plurality of series connected diodes to form a transmission line switch and also utilizes filters having inductive elements which are configured by etching processes

10 Claims, 11 Drawing Sheets

EXPANDABLE CABLE TELEVISION SUBSCRIBER CONTROL SYSTEM

BACKGROUND OF THE INVENTION

This application is a continuation-in-part of U.S. Ser. No. 673,872, filed Mar. 22, 1991 now U.S.. Pat. No. 5,140,633 which is incorporated by reference herein.

The invention relates to a improved subscriber control apparatus which resides outside of the subscriber's residence and which is controlled by the cable operator at the headend. Such devices eliminate the need for individual set top subscriber units which translate all selected programming onto a single VHF channel, and allow the subscriber to obtain full use of sophisticated features now available on television receivers and VCRs. Using such control devices, all programming channels available to a cable subscriber, are selected by the subscriber's receiver or VCR.

These devices also incorporate means to selectively interdict or "jam" certain signals on selected channels, on a per subscriber basis, in order to provide pay television or subscription television services.

Existing control devices, which are also known in the cable television industry as interdiction systems, include control systems in which multiple fixed oscillators are coupled to multiple subscribers through a switching matrix. Other systems use one or more oscillators which are "frequency agile" and therefore can jump from one frequency to another under programmed control, in order to interdict more than one channel.

U.S. Pat. No. 4,039,954 describes a control system in which a number of multiple fixed frequency oscillators are shared among an equal or greater number of multiple subscribers through a switching matrix. This is known as "space-division switching" of oscillators. This system suffers from a limited jamming capacity since each oscillator operates at a single frequency.

U.S. Pat. Nos. 4,424,436; 4,769,838; 4,450,481 and 4,792,971 all disclose control devices which use a single frequency agile oscillator to provide jamming of a plurality of channels ("time division multiplexing") for multiple subscribers. While these devices also provide space-division switching of the oscillator for resource sharing, in most cases no more than four channels can be reasonably secured using these devices because single oscillator based jamming results in a less secure video jamming effect.

U.S. Pat. No. 4,912,760 describes an apparatus which uses more than one frequency agile oscillator to jam a plurality of channels for each subscriber. Using time-division multiplexing, each group of oscillators provides more secured video jamming than a single oscillator would, however a group of oscillators and associated control electronics must be provided for each subscriber. Physical space and cost therefore become limiting factors and field expansion of the number of subscribers is therefore limited.

U.S. Pat. No. 4,769,838 describes a method for calibrating a single frequency agile oscillator and subsequently using the calibrated control voltages for jamming at high speeds. The method of calibration involves applying a control voltage to an oscillator and counting the frequency of the oscillator and adjusting the control word (voltage) until the described jamming frequency is obtained. U.S. Pat. No. 4,912,760 utilizes this method to calibrate its multiple oscillators by sequentially selecting one oscillator at a time. With this calibration method, frequency counting of the oscillator has to be done for every adjustment made on the control voltage word. To reduce the total calibration time, either high speed or programmable counters must be used, resulting in more complex hardware and/or firmware.

Prior art systems provide a jamming effect on audio information as a by-product of video carrier jamming. To produce this effect, jamming carrier level is maintained above or within a decibal below the video carrier. It is however, relatively easy to defeat this type of audio jamming since the actual jamming is not done to the audio signal itself; also the audio jamming effect depends entirely on the type of detection mechanism used in the subscriber's television receiver thus compromising audio signal security.

Prior art systems typically use PIN diode based RF switches or RF transistors for high isolation RF switches which are relatively expensive.

Filters in prior art interdiction systems typically use conventional air wound coils that are difficult to manufacture and install during assembly. These filters also require tuning adjustments which further complicates manufacturing in high volume.

As in the parent application, one object of the instant invention is to provide substantial control of the program signals available to a cable subscriber but at reduced cost and increased efficiency and flexibility of service.

Another object of the invention is to provide subscriber control system which is more reliable and less expensive to manufacture than the prior art devices and which provides solutions to the problems described above with respect to the prior art devices.

Another object of the invention is to provide an improved method of calibrating voltage controlled oscillators in a subscriber control system.

SUMMARY OF THE INVENTION

A feature of the instant invention is that it comprises an improved subscriber control system which shares control and oscillator circuitry among a plurality of subscribers using both time-multiplexing and space-division switching of this circuitry.

Another feature of the invention is that the oscillator or "jamming" circuitry comprises a plurality of jammer modules each comprising a plurality of frequency agile oscillators.

Still another feature of the invention is that all of the jammer modules are controlled by a single control module.

Yet another feature of the invention is that each of the oscillators can be adjusted in frequency in response to control signals sent as data from the cable headend, in order to generate jamming signals to selectively control reception by unauthorized subscribers of program channels provided by the CATV system. The output of each oscillator is split and directed in multiple output paths. Each path contains an RF switch to provide control of the output which is made available for each subscriber. The outputs of RF switches related to the different oscillators are then combined, providing a composite jamming signal for each selected subscriber.

Another feature of the invention is that all of the active circuits including control and oscillating circuitry, are provided as modules which can be installed in the field and activated and controlled by signals received from the cable headend, thus providing for substantial subscriber connection to the system regardless of actual usage of the jamming functions, and allowing for modular expansion capability in the field.

Yet another feature of the instant invention is that it comprises a "backplane" system comprising only passive components, as a pre-installed part of the interface between different modules.

A further feature of the invention is that it permits space-division switching of the modular jamming and control circuitry among a group of subscribers. Jammer modules each comprise a plurality of time-division multiplexed frequency agile jamming oscillators that are shared by the group of subscribers.

Another feature of the invention is that it provides the cable operator with a choice between jamming a larger number of channels by time-division multiplexing the frequencies of the jamming oscillators of a jammer module to a greater extent, or providing improved signal security by assigning one or more of the jamming oscillators to a single "full-time" frequency for greater security with regard to the information provided on a single channel.

Another feature of the invention is that each jamming oscillator which is assigned to a single frequency can utilize low frequency modulation of its control voltage (using random, pseudo-random or deterministic waveforms) to provide a frequency spread of the resulting jamming signal which essentially obscures video information on the jammed channel while making trapping of jamming signal extremely difficult if not impossible.

Still another feature of the invention is that direct jamming at the audio frequency portion of a television signal is made possible by scaling the output of one or more oscillators to approximately match the audio signal level.

The preferred embodiment of the invention described in this application represents an improvement over the embodiment of the subscriber control system described in the parent application. Among other differences, it utilizes high-loss, low cost resistive devices to perform signal splitting and combining. These resistive splitters and combiners are made from low cost resistors and are easily manufactured in high volume. To compensate for the loss in these devices, the jamming oscillators are run at high output levels. Since electronic oscillators are regenerative, higher output levels are obtained easily without a significant increase in power consumption.

Regenerative oscillators always produce harmonics of the desired frequency and therefore the jamming signals have to be filtered before combining them with the cable signals. The RF switches also produce harmonic products due their non-linear operation. In the prior art systems, unwanted harmonics are removed by providing low-pass filters at the output of the oscillators and by running the RF switches at current levels which are sufficient to be effective but which are kept at levels which produce acceptable distortion. The preferred embodiment of the invention moves the filtering capability to the output of the switches, in each jammer module, after combining the signals from two or more oscillators. This method helps reduce the number of filters required and at the same time allows for low current operation of the RF switches and reduced power consumption. The filters also substantially eliminate harmonics generated by the switches.

Typically RF filters are made using air wound coils and capacitors. The coils are tuned during device manufacture, to get the required harmonic suppression and pass band frequency response. Since air wound coils tend to couple to each other, the filter sections must be well shielded from each other. The preferred embodiment of the invention uses coils which are actually etched as part of the printed circuit board. This eliminates the need for tuning since the printed coils can be made to precise values using modern printed circuit board techniques. The filter sections comprising the printed coils do not require shielding because the electrical field produced by each printed coil is directed to the ground plane underneath the printed coils.

The preferred embodiment of the invention utilizes, low capacitance diode switching which provides the required ON/OFF isolation while providing simple drive requirements.

The invention further comprises a four step method in which the frequencies to be jammed and subscriber authorization and connectivity data are provided to the control device using a data communication channel from the cable head end. The method sequence is repeated under headend control or on an autonomous time-out interval pre-set by the headend.

In the described preferred embodiment, a subscriber control system comprising the invention, can provide control for four subscribers with jammer modules which each comprise four frequency agile oscillators. These jammer modules can be added to the system as needed, providing the option of having 4, 8, 12, or 16 oscillators available for service access control. This provides a cost effective product when fewer oscillators are needed, while maintaining an effective method of upgrading service access control in the event that additional services are added to the system, without having to add redundant control and switching circuitry. It is to be understood however, that the number of subscribers served and the number of service signals controlled can be increased or decreased and still remain within the province of the invention.

DESCRIPTION OF THE PREFERRED EMBODIMENTS OF THE INVENTION

Figure 1:
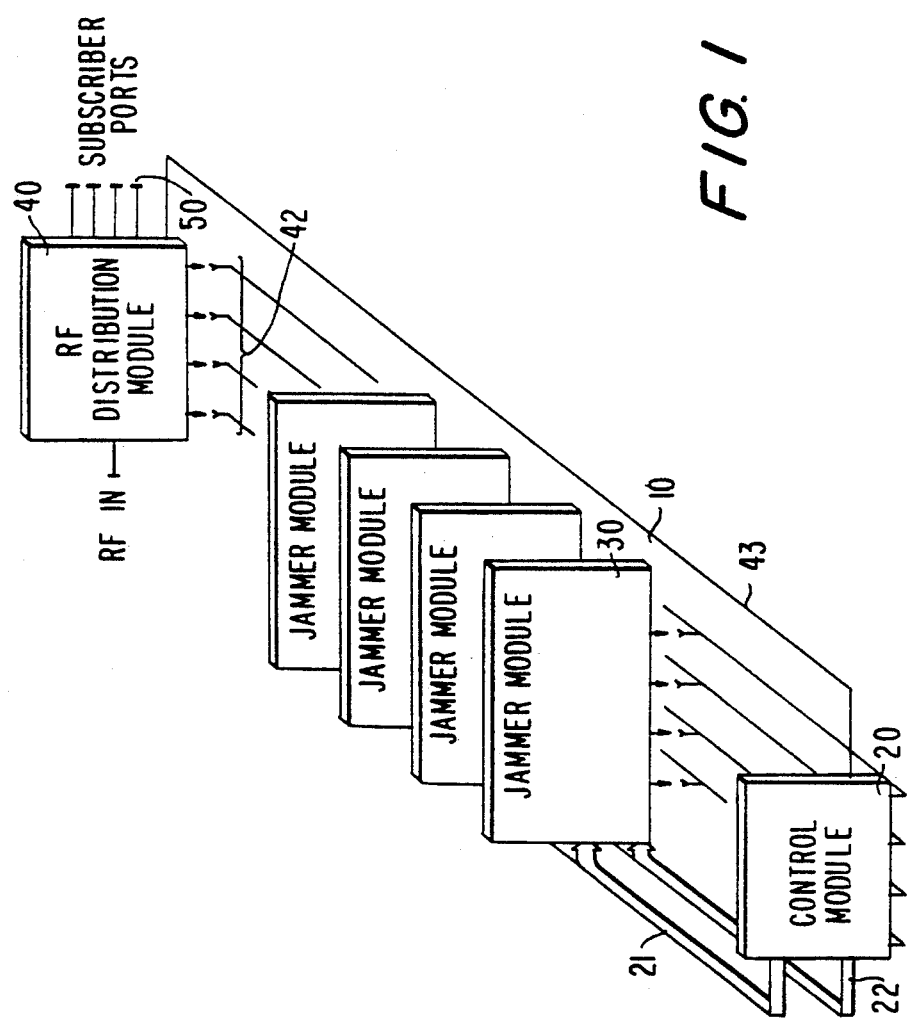
FIG. 1 is a block diagram of subscriber control system comprising the invention, showing the major functional elements.

FIG. 1 is a block diagram of subscriber control system comprising the invention. The subscriber control system comprises a backplane 10 and a plurality of active modules comprising a plurality of jammer modules 30, a control module 20 and an RF distribution module 40. As shown in FIG. 1, each of the modules can be "plugged in" to the backplane 10 which provides connectivity between the modules, the headend and the subscribers via the subscriber ports 50. The circuitry of, and functions provided by, the control module 20 and the RF distribution module 40, are common to each of the jammer modules 30. The jammer modules 30 are all available to each of the subscribers, connected by subscriber ports 50, by space-division switching which takes place in the RF distribution module 40. A power supply (not shown) can be shared by all of the modules.

Because both the control module 20 and RF distribution module 40 are shared, the number of jammer modules 30 can be varied, and jamming capacity increased or decreased by adding or removing jammer modules, without altering the control or distribution circuitry. Repairs or updates can easily be made in the field due to this modular design. When the system is configured with no jammer modules, it acts as an "active tap" providing ON/OFF control for each of the subscriber ports.

Figure 2:
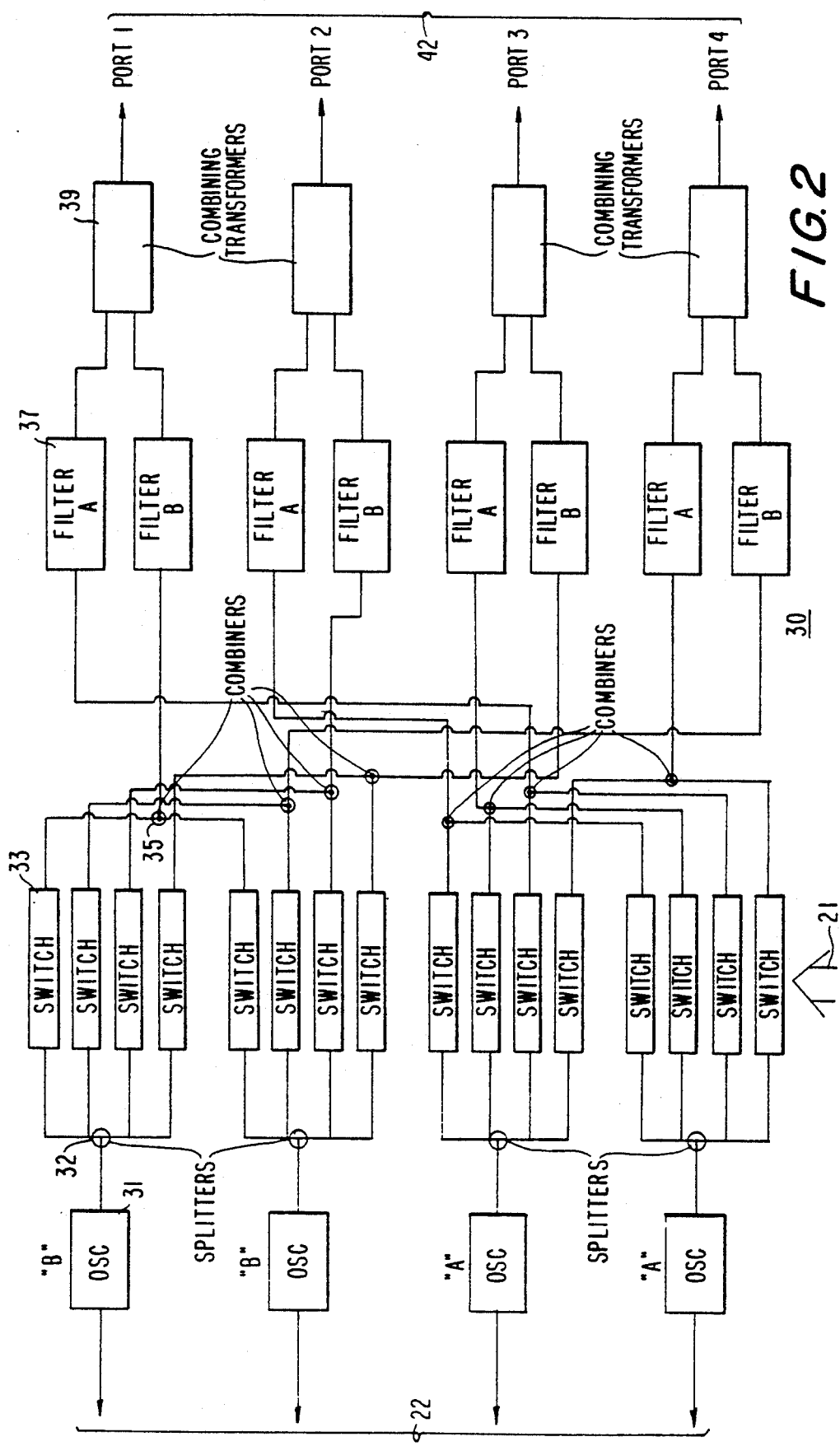
FIG. 2 is a block diagram of a jammer module.

FIG. 2 is a block diagram of a jammer module 30. In the embodiment shown, the jammer module provides up to four modulated or unmodulated jamming oscillator signals to any one of the output ports 42 in any order, at any time, and in any combination. Each jammer module 30 comprises four oscillators 31. The signal generated by each oscillator 31 is resistively split four ways and passed through a group of four parallel steering switches 33.

Each four way resistive splitter 32 is configured to simultaneously divide each oscillator output signal into four parts having equal magnitudes and phases over a broad bandwidth, to produce the necessary characteristic impedance match, to generate the specific attenuation needed for oscillator signal isolation, and to yield a high degree of oscillator load pull insensitivity.

The outputs of steering switches 33 are then combined through eight resistive combiners 35 forming eight possible oscillator outputs. Each resistive combiner output is the output of two of the oscillators which share a common frequency band, denoted as "A" or "B". Each pair of resistive combiner outputs is passed through a harmonic filter 37 to remove unwanted harmonics and spurious responses. This output arrangement enables multiple band operation. The outputs of pairs of harmonic filters 37 are combined through matching and combining transformers 39. The four outputs of the combining transformers 39 are then passed on to the four jammer output ports 42.

Figure 5:
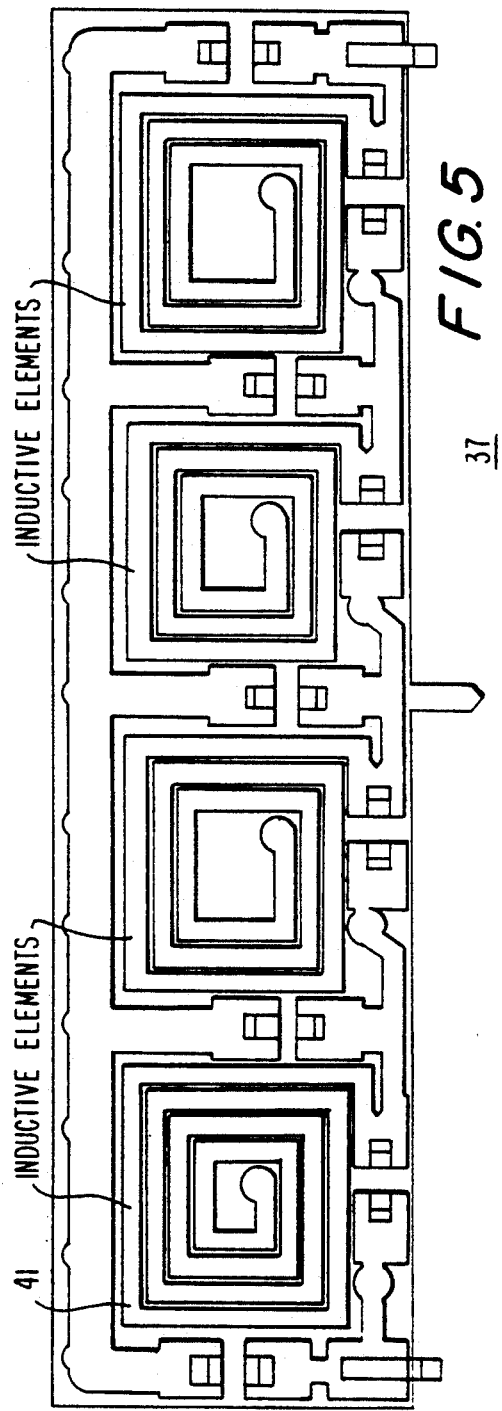
FIG. 5 is a printed circuit of a harmonic LC filter comprising etched inductive elements.
Figure 6:
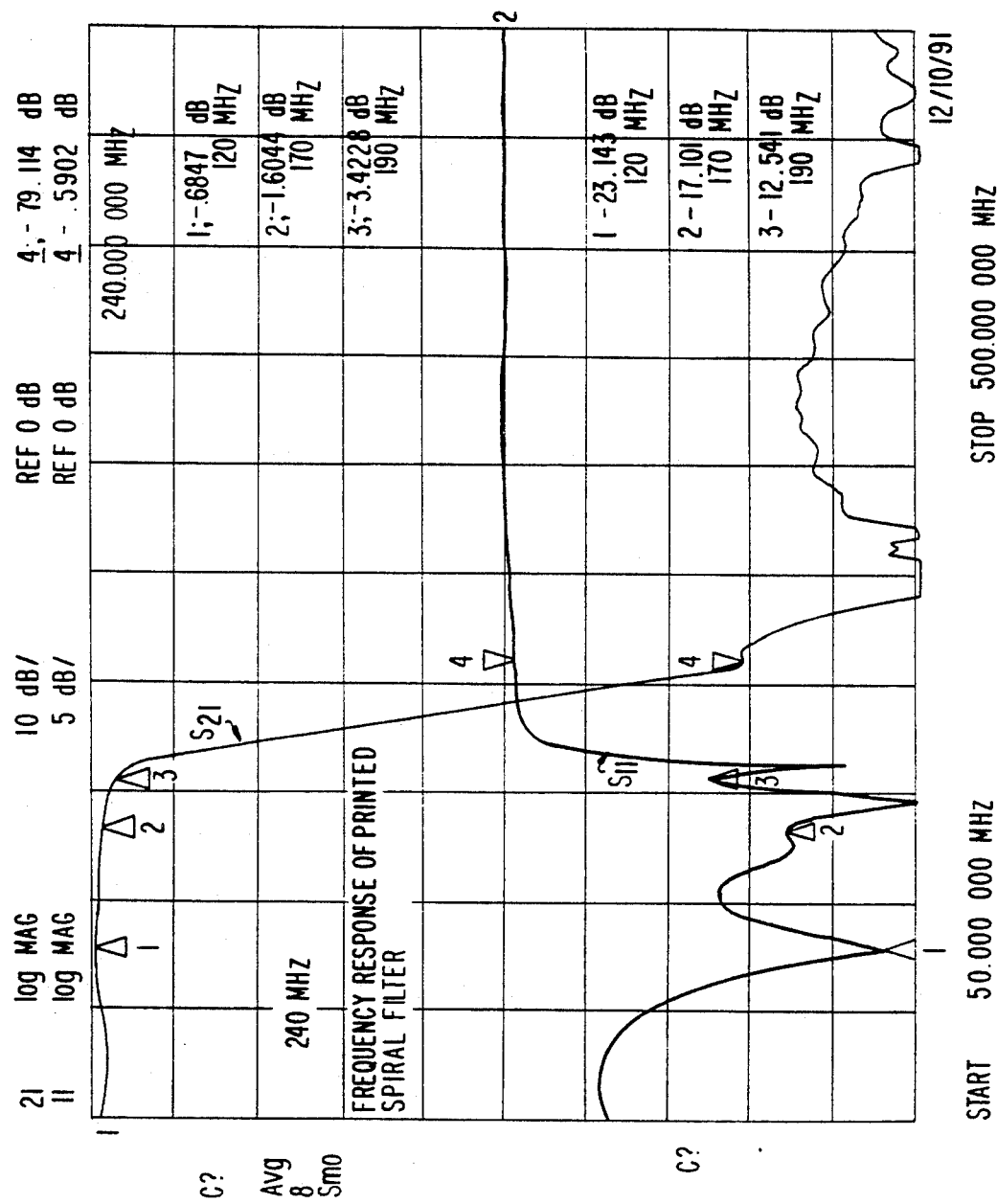
FIG. 6 is the frequency response of a printed circuit filter.

As shown in FIG. 5, each inductive element 41 forming harmonic filter 37 is implemented as an etched spiral printed circuit comprising semi-distributed printed square or curved spirals in microstrip fashion. These inductors 41 provide excellent performance with respect to low insertion loss, superior flatness, good return loss, and excellent out of band attenuation without shielding, at all frequency bands. FIG. 6 is a graph which indicates the typical frequency response of harmonic filters 37. While the present embodiment is implemented primarily in a low pass configuration, the technique comprising the use of printed spiral inductors, applies equally well to high pass, band pass, notch, and other filter configurations.

Figure 5A:
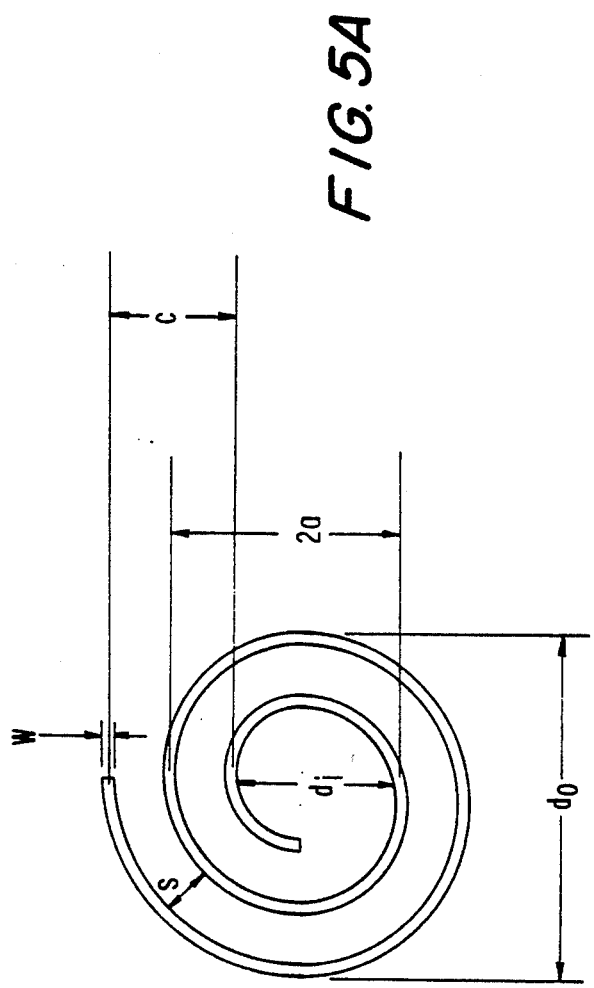
FIG. 5A is diagram of a spiral embodiment of an etched inductive element.

Design of the etched inductive elements can be implemented by first designing theoretical filters meeting the specific circuit parameters, using known design techniques. For a particular filter design, one or more inductance values are calculated. For each inductance value, the structure of an equivalent etched inductive element can be determined according to the following formula (defined in accordance with the spiral pattern shown in FIG. 5A):

$$L = 0.03125 n^2 d_o * k,$$

where $d_o = 5 d_i - 2.5 n (w + s)$, n = number of turns, s = the distance between the spiral arms and w = the width of the spiral line in mils. The multiplier coefficient k is the correction factor to account for different circuit board materials, substrate dimensions, frequency band and particular geometry factors. A reasonable starting value for k is 0.9. Optimum values can be found without undue experimentation by those skilled in the relevant art.

The Q of the etched inductive element can be calculated from the following equation:

$$Q = 2 * 10^{-9} f w a / (KR(8a + 11c)),$$

where f = frequency in MHz., $a = (d_o + d_i)/4$, $c = (d_o - d_i)/2$, R = surface resistance in ohms. K is a correction coefficient to compensate for current crowding and radiation at higher frequencies.

The net inductance of a square shaped etched inductive element can be calculated from the formula:

$$L = 8.5 A^{0.5} n^{1.67} * k,$$

where A is the surface area in mils.

Figure 7:
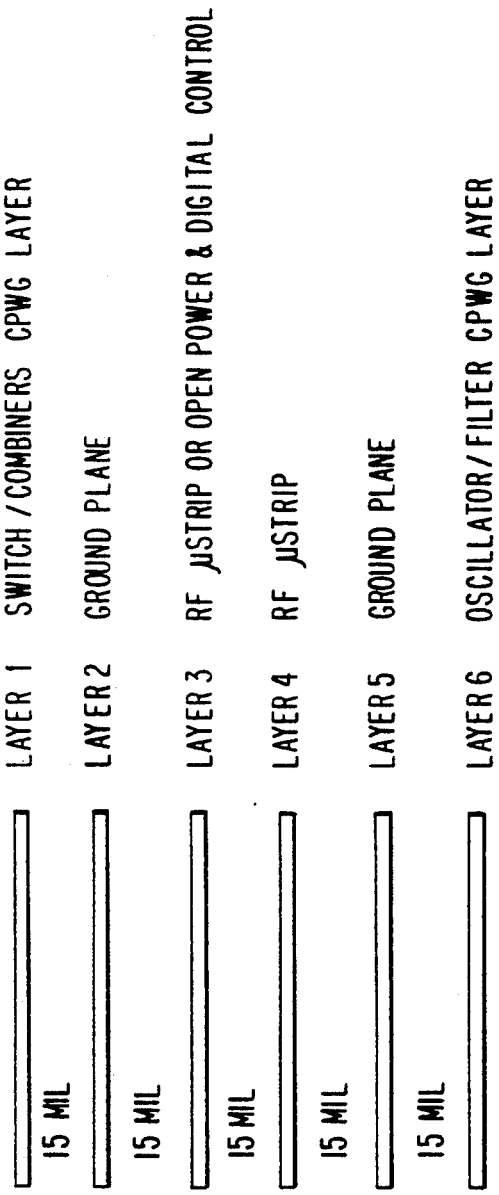
FIG. 7 is a cross-section of a multilayer design for a jammer module board.

The harmonic filters 37 can be on separate circuit boards or printed directly a jammer module main board constructed in the multilayer design described in FIG. 7.

Figure 3:
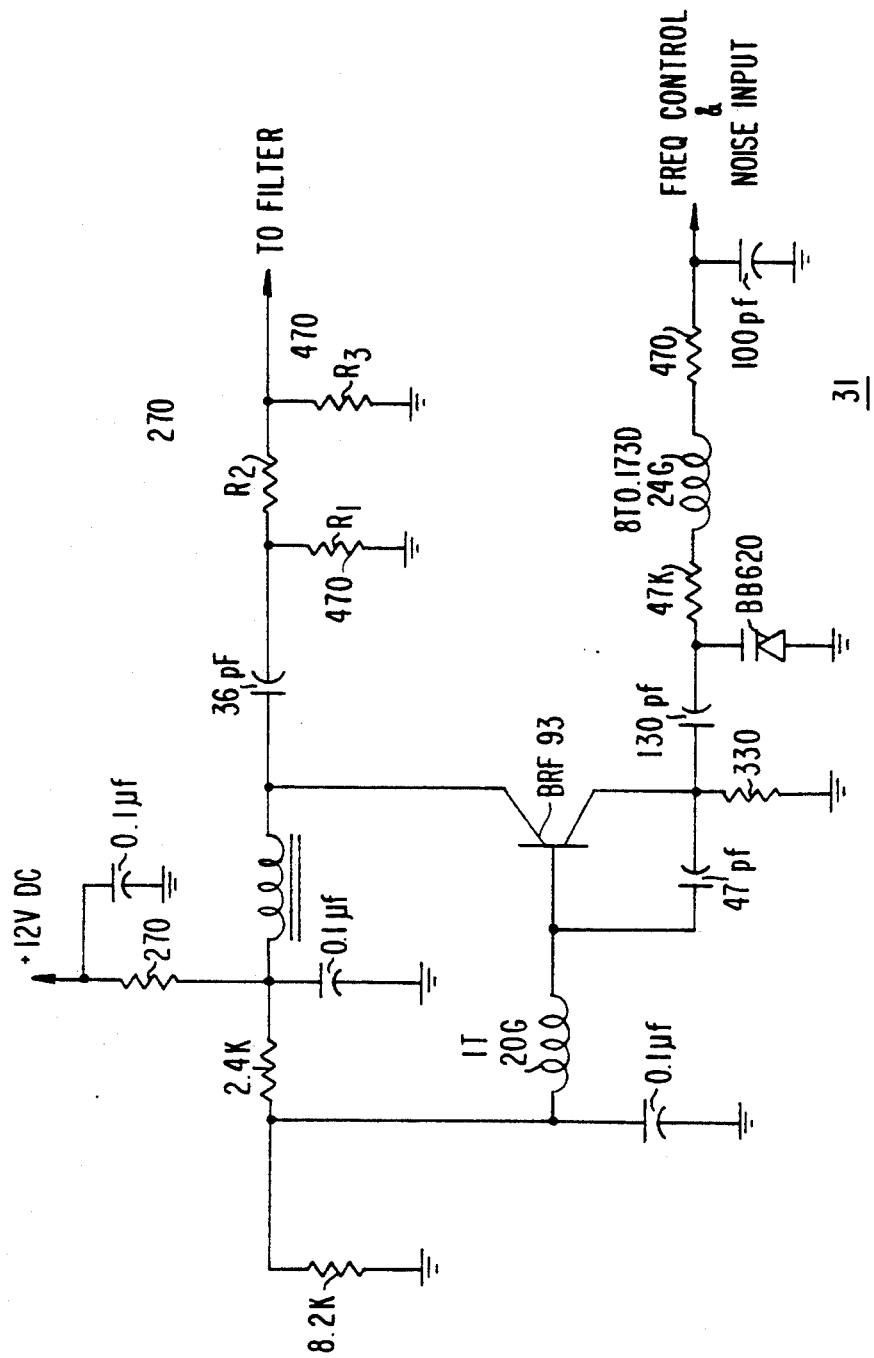
FIG. 3 is a schematic diagram of an oscillator suitable for use in the jammer module.

Each oscillator 31 can be, for example, a voltage tuned, RF negative impedance generator, optimized to provide extremely flat output power over better than one octave of frequency. FIG. 3 is one example of an oscillator suitable for use in the jammer module 30 which can operate over the entire cable television spectrum with only minor parts value modifications. Inherent to the oscillator 31 design is the provision for high level output, low power dissipation, and a high FM modulation index capability.

Figure 4:
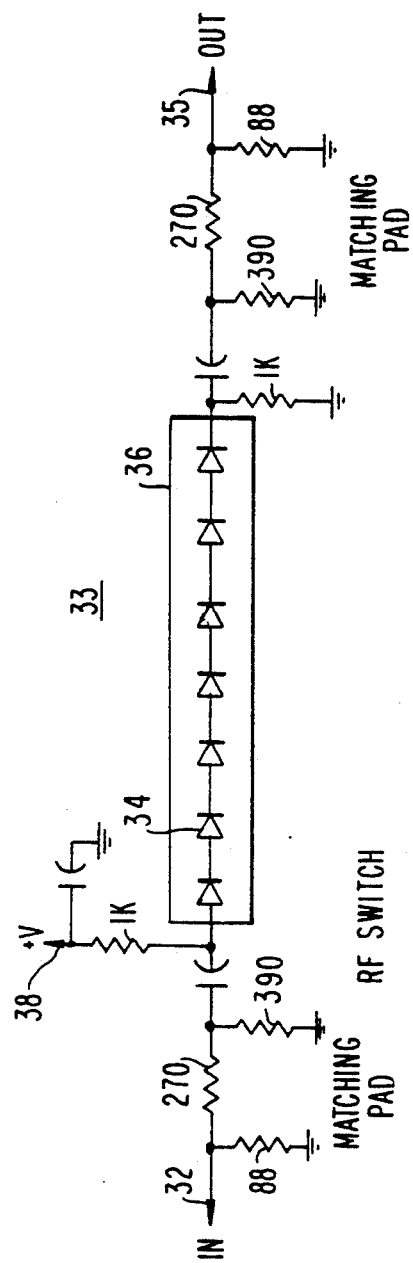
FIG. 4 is a circuit diagram of a high isolation RF switch.

FIG. 4 is a schematic diagram of a preferred embodiment of a diode switch suitable for use as a steering switch 33. Consisting essentially of multiple diodes 34 placed in series, the switch is activated by a simple series current which simultaneously opens all diodes to the passage of an RF signal. At either end of the switch the DC current is capacitively blocked and the input and output of the switch may be resistively matched to form an absorptive RF switch.

The diodes can comprise MELF switching diodes which are soldered together in series. The soldered diodes can be insulated with heat shrink tubing 36. The diodes each have a junction capacitance of approximately b 2 pf., and when a number of them are used in series as shown, only approximately 0.083 pf. of coupling is present through the series array of diodes during an OFF condition, thereby giving excellent isolation at high frequencies. During the ON condition, the diodes are forward biased and provide a low resistance path for the RF. The shrink wrapped diode array can also be placed inside a piece of copper or brass tubing to help prevent RF coupling through the air.

The overall insertion loss of the steering switch 32 may be controlled by the amount of current drawn, and very little current is required to produce a low insertion loss state. The RF flatness, and OFF state input to output isolation with respect to frequency is adequate for use as a steering switch 33.

By selecting a specific combination of steering switches, selected oscillator jamming signals are steered to specific jammer output ports 42 which are coupled to the RF distribution module 40. The steering switches are controlled by voltages 38 supplied by the control module 20 via bus 21 which is coupled to each steering switch 33.

Figure 8:
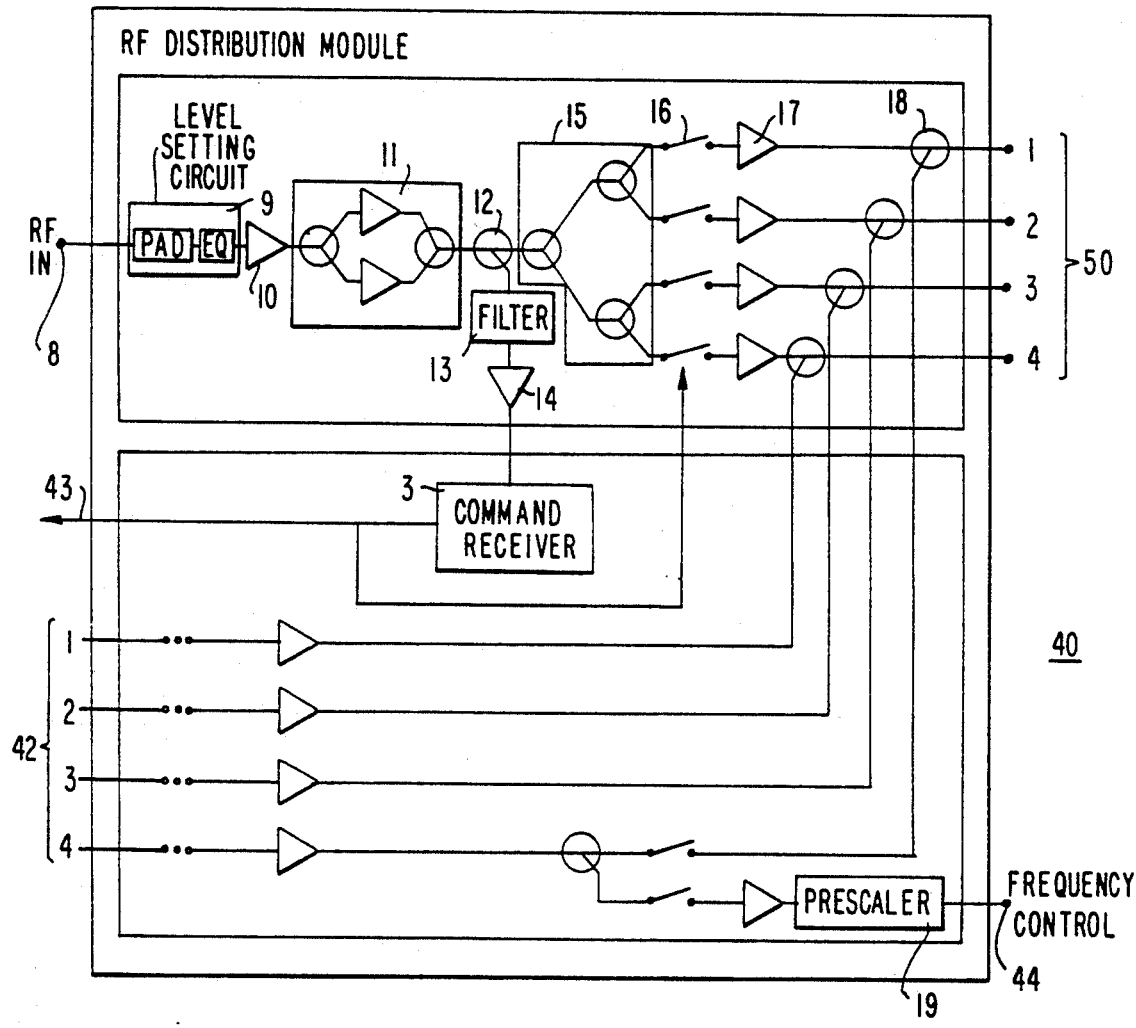
FIG. 8 is a block diagram of an RF distribution circuit.

The RF distribution module 40 is described in detail in FIG. 8. The module provides a path from the input port 8 providing the cable television signals from the headend, to each of the subscriber ports 50. Broadband cable television signals enter at a common input port 8 and pass through a level setting circuit 9 that may consist of attenuators, slope equalizers, and/or automatic gain control circuitry. A single stage monolithic microwave integrated circuit amplifier (MMIC) 10 coupled to a push-pull MMIC amplifier configuration 11, raises the signal level and also prevents the jamming signals provided by the jammer modules, from exiting through the input port 8 and creating interference on the main cable television distribution system. The broadband signals then pass through a coupler 12, which directs a sample of the signal through a filter 13 and amplifier 14, to a data command receiver 3. The data receiver 3 comprises a frequency shift key (FSK) demodulator which receives bi-level frequency shift keyed information from the headend, demodulates and translates this information to serial logic level signals which are ported to the command module via two way control data bus 43.

The main output of coupler 12 is divided by three two-way transformer splitters 15, into four equal amplitude signal paths, one for each subscriber port. Each splitter output passes through an RF switch 16 which can be of the same type as the above described steering switches except with increased current biasing to produce minimum distortion products. Each of the RF switches 16 is controlled by the control module 20 via bus 43.

In order to bring the divided RF levels to the level required for the subscriber drops 50, each switch output is passed through an MMIC amplifier 17. Each amplifier 17 is followed by a directional coupler 18 which couples each of the four divided signals to respective jamming signals coupled via bus 42 from the jammer module 30.

Figure 9:
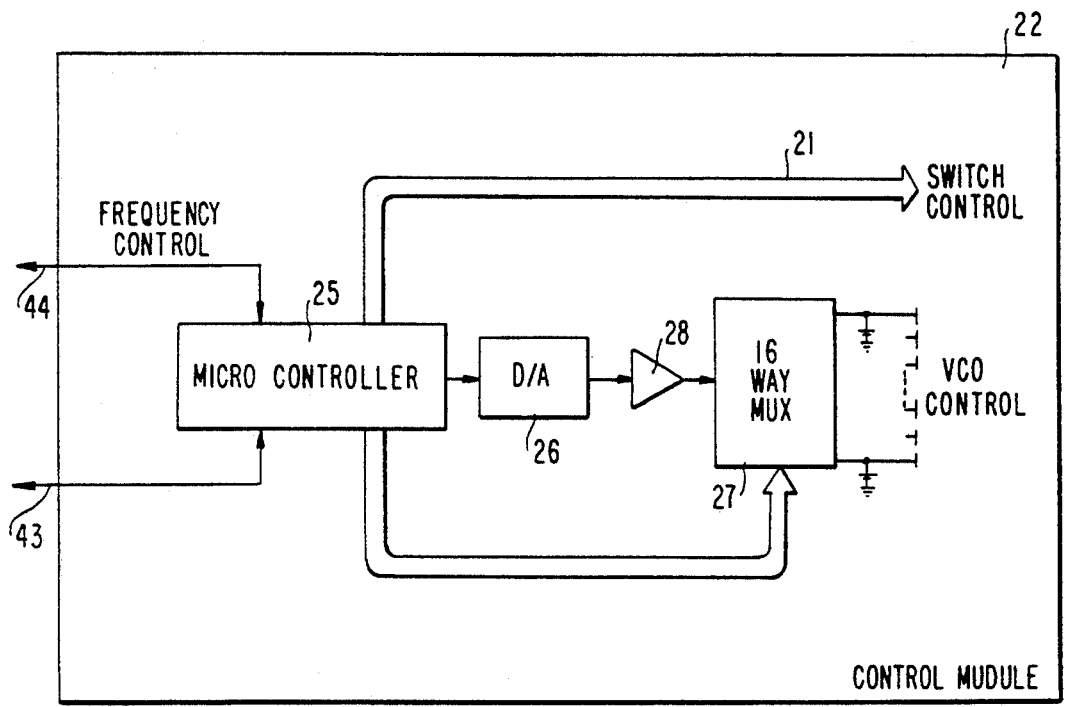
FIG. 9 is a block diagram of a control.
Figure 10:
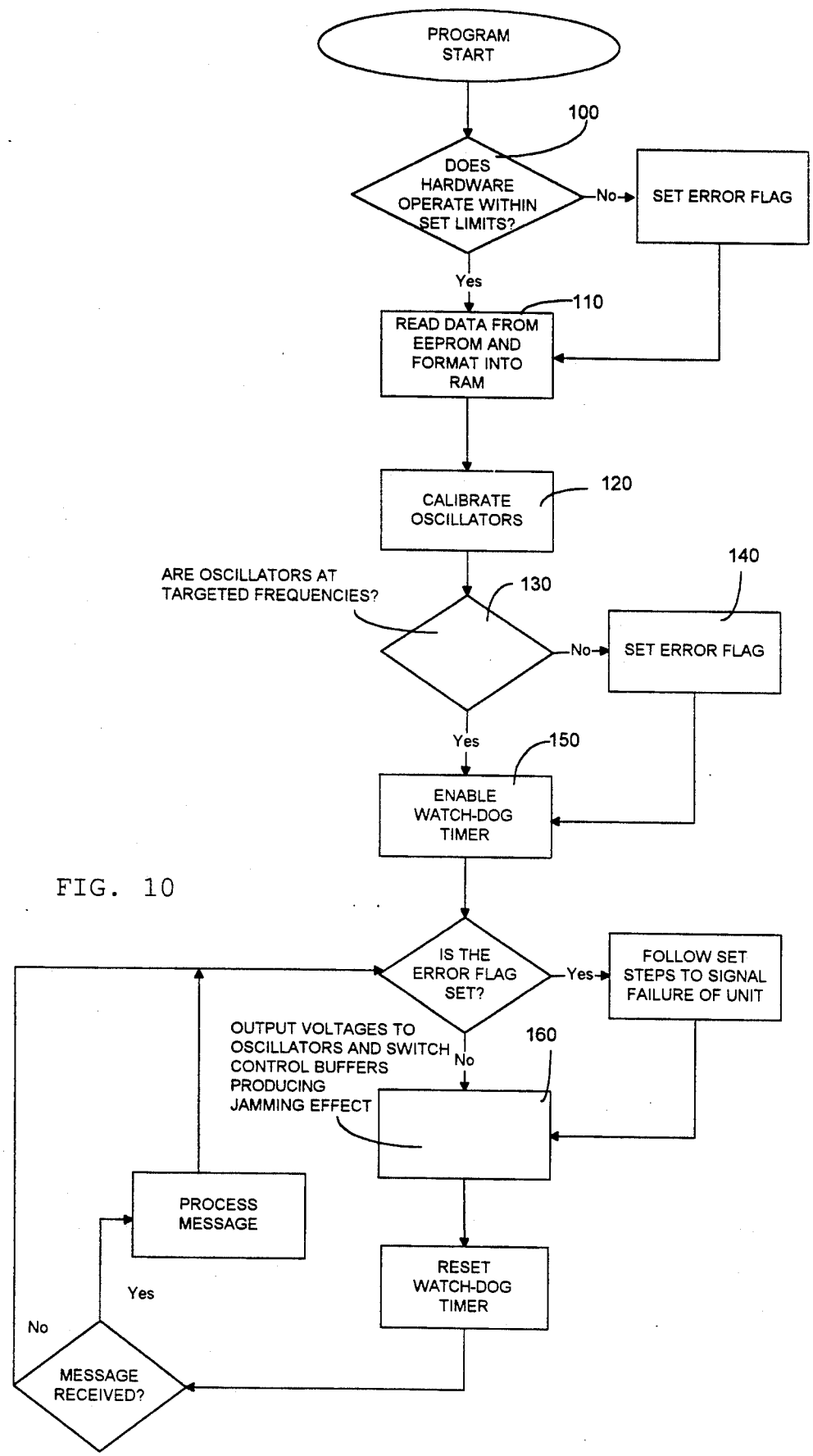
FIG. 10 is a flow chart illustrating the masked microcontroller program.

The control module 20 described in FIG. 9 performs several functions using microcontroller 25. The functions comprise:

1) generating individual analog control voltages for the oscillators 31 using D/A converter 26 and multiplexer 27, via VCO control bus 22;
2) digitally controlling steering switches 33 via control bus 21;
3) controlling subscriber authorization and actuation of switches 16, and processing communications data from the command receiver 3, via bus 43;
4) providing a modulation source 28 for varying the control voltages of the VCOs; and
5) connecting one subscriber's RF output to the prescaler 19 for calibration via frequency control bus 44.

Also located on the control module 20 (but not shown) are a crystal oscillator which controls the processing speed, a regulator which controls voltage regulation and power-up/down reset, a counter, counter which can be coupled to each oscillator or to the prescaler during calibration and non-volatile read/write memory (for example an EEPROM) which stores subscriber authorization information and RAM for storing look up table values used in calibration.

The microcontroller 25 has a masked program which starts when the control module 20 is powered up. Components of the system are checked for functionality and performance within set limits including the RAM. This data includes subscriber authorization and on/off information, oscillator configuration and target frequencies for jamming. The program then calibrates the oscillators to the targeted frequencies and enables the communications interface for receiving and/or sending data. Finally the an on board watch-dog timer is enabled. The watch dog timer will initiate a restart sequence in most cases where the program fails to execute correctly. Such timer circuits are well known to those skilled in the engineering art.

After completing the power-up function sequence, the program then enters an endless loop of:

1) utilizing the D/A converter and demultiplexer to output voltages to the oscillators and switch control buffers to direct the oscillator outputs for jamming,
2) service the watch-dog timer,
3) process communications data when the input buffer is full, and
4) if any of the above functions fail to operate correctly or within set limits the program will then take actions to indicate a failure within the unit.

Figure 3A:
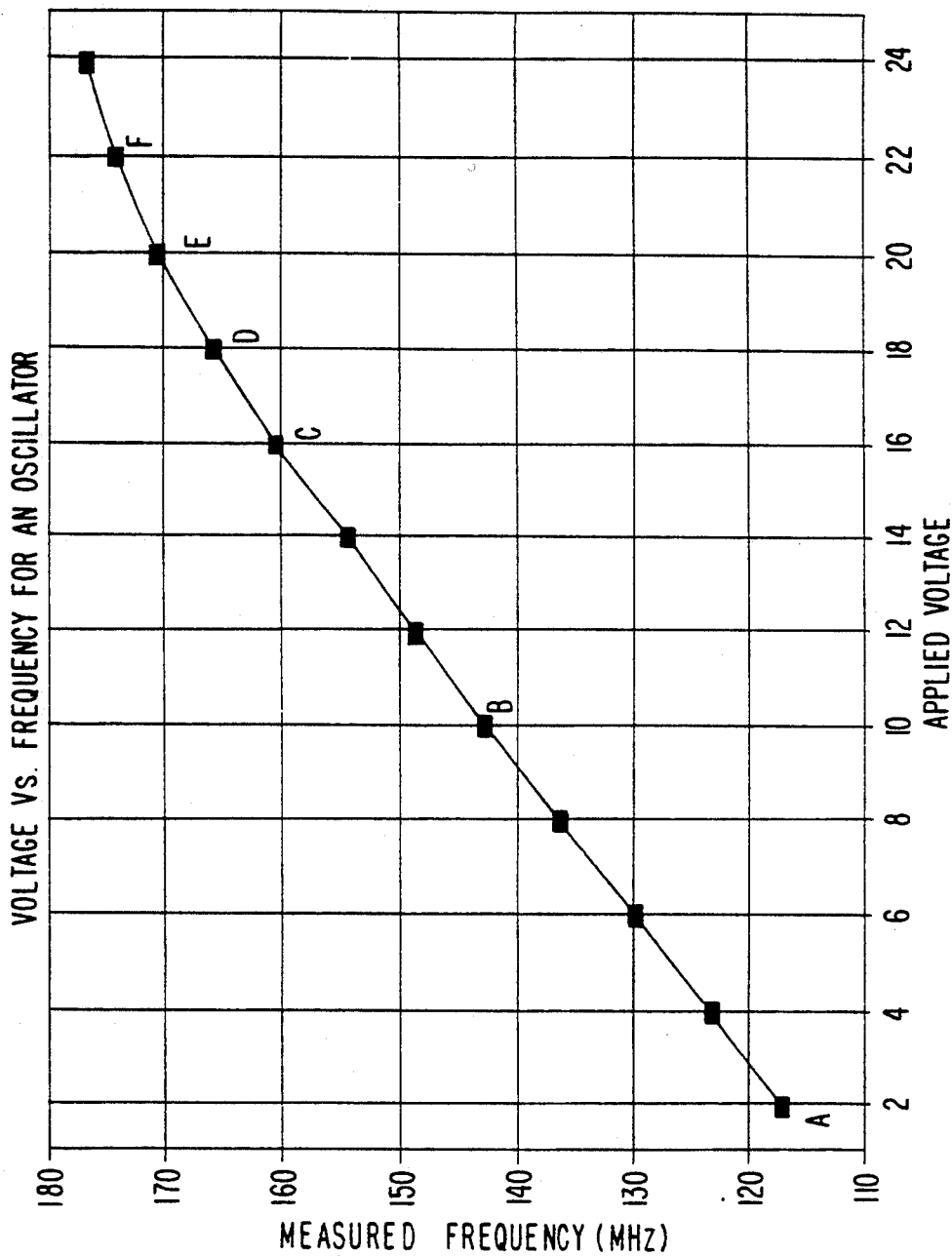
FIG. 3A is a voltage vs. frequency graph for an oscillator as shown in FIG. 3.

The invention comprises a calibration method for the oscillators which permits precise frequency control to be maintained without the need for costly and complex controllers and programmable counters. When the oscillators of the jammer modules are designed, each oscillator is analyzed to determine its ideal Voltage/Frequency operating characteristic. A graph illustrating such a characteristic is shown in FIG. 3A. Several voltage samples (A-F) are chosen along the characteristic curve which reflect to frequency ranges within which each respective oscillator may operate (i.e. possible jamming frequencies). Voltage samples are programmed into the EEPROM during manufacture of the control module.

Table I is a flow chart illustrating a preferred embodiment of the masked micrcontroller program which controls the operation of the subscriber control system in the following sequence.

When the system is powered on, or as directed by the headend during operation of the system, a hardware check is made 100 and then the voltage samples stored in the EEPROM for the respective oscillators are loaded from the EEPROM into a first portion of the RAM. In addition subscriber information including the jamming frequencies to be generated by each oscillator are loaded into the RAM from the headend or the EEPROM (110).

A calibration of the oscillators (120) follows in which a number of voltage samples stored in the EEPROM are applied to a first oscillator in a first jamming module. The voltage samples are sequentially applied to the oscillator and for each voltage sample a corresponding frequency is measured using pulse counting techniques in concert with the counter in the control module, for example. A voltage/frequency look up table is set up in RAM for the oscillator which stores each voltage sample and the respective frequency actually generated by the oscillator at that voltage sample.

Voltages corresponding to each of the jamming frequencies (i.e. frequencies related to the program channels to be jammed) at which the oscillator will operate are computed by the microcontroller, by simple interpolation techniques, using, for each jamming frequency, the next higher frequency value and the next lower frequency value, and their respective voltage samples stored in the voltage/frequency look-up table. A second look up table (a jamming voltage/frequency table) is then set up in a second portion of the RAM with each jamming frequency and its respective calculated voltage.

The calibration steps described above are repeated for each oscillator creating a jamming voltage/frequency look up table for each oscillator in each jammer module.

After the initial calibration of the oscillators, one voltage from each jamming voltage/frequency look up table is selected at random, and applied to the corresponding oscillator (130). The resulting frequency generated by the oscillator is compared with the corresponding frequency in the oscillator's voltage/frequency look-up table, and if it does not fall within a required tolerance (which can be determined by the headend computer), a hardware error flag is set and the system is shut-down (140). If the generated frequency is within the required tolerance, then the watch dog timer is enabled a jamming step (160) is started.

In the jamming step (160), the respective jamming voltage/frequency look up tables are read by the microcontroller and the voltages corresponding to the jamming frequencies stored in each table are applied to the respective oscillators at a variable rate averaging about two kilohertz for those oscillators which change frequency in a time-division multiplexed fashion. The fixed frequency oscillators (i.e. only one voltage/frequency combination stored in a respective jamming voltage/frequency look up table) are refreshed at a rate of approximately one hundred hertz to compensate for any leakage in associated sample and hold circuits.

By keeping the frequency hopping rate at sub-multiples or multiples of horizontal or vertical synchronizing frequency of the video signal, the television picture can be made to lose synchronization resulting in scrambled picture.

The jamming step (160) is continued until either a calibration command is received from the headend or a pre-set time-out interval occurs. In either case, steps 100 through 160, are then repeated.

In case of a verification failure in step 130, a system shutdown results in a pre-programmed action which may be a subscriber disconnect or a connect/disconnect sequence with pre-programmed timing interval. While in a verification failure mode, the apparatus continues to listen to headend commands and time-out interval checks to re-initiate the four step sequence (110,120,130 and 160) periodically.

We claim:

1. A modular subscriber control apparatus for controlling access to cable television signals in response to control data transmitted with said cable television signals by a headend, said apparatus comprising:
   a) a single distribution module comprising:
      i. means for receiving said cable television signals and said control data; and
      ii. a plurality of subscriber ports for providing program outputs via first switch means responsive to a first switch signal, to respective subscribers;
   b) a plurality of jammer modules coupled to said distribution module, each jammer module comprising:
      i. a plurality of frequency agile oscillators each responsive to respective frequency control signals, and
      ii. second switch means, responsive to a second switch signal, for directing selected outputs from said plurality of frequency agile oscillators to said distribution module for distribution to said respective subscribers; and
   c) a single control module coupled to each of said jammer modules and said distribution module, said control module comprising means for deriving said first and second switch signals and said frequency control signals from said control data.

2. The subscriber control apparatus of claim 1, wherein each of said jammer modules comprises filter means at the output of said second switch means.

3. The subscriber control apparatus of claim 2, wherein said filter means comprises etched inductive elements.

4. The subscriber control apparatus of claim 1, wherein said second switch means comprises a plurality of high frequency, high isolation diode switches each comprising a plurality of diodes connected in series.

5. The subscriber control apparatus of claim 1, wherein said jammer module further comprises a multi-layer circuit board substrate.

6. The subscriber control apparatus of claim 1, wherein said jammer, distribution and control modules are removable coupled to a backplane containing only passive devices.

7. The subscriber control apparatus of claim 1, wherein each jammer module comprises at least one single frequency oscillator and at least one oscillator operating at a plurality of time multiplexed frequencies.

8. The subscriber control apparatus of claim 1, wherein said frequency control signals comprise control voltages, said apparatus further comprising means for modulating said control voltage by a low frequency waveform.

9. The subscriber control apparatus of claim 1, wherein at least one oscillator is configured to directly interfere with an audio portion of said cable television signals.

10. A method for calibrating a voltage controlled oscillator which is part of an apparatus which controls access to cable television signals in response to control data transmitted with said cable television signals to said apparatus from a headend, wherein said apparatus further comprises first memory means in which a plurality of preprogrammed voltage samples are stored and second memory means, and said control data comprises frequency jamming information related to at least one jamming frequency at which said oscillator will operate, said method comprising the steps of:

a) applying each of said pre-programmed voltage samples to said oscillator and measuring the resulting respective oscillator frequencies;

b) generating a first lockup table in said second memory means which indexes pre-programmed voltage samples to said resulting respective oscillator frequencies;

c) deriving a jamming voltage sample for each of said at least one jamming frequency by interpolation using said first lockup table; and d) generating a second lookup table in said second memory means which indexes said at least one jamming frequency to its respective jamming voltage sample.

* * * * *